United States Patent [19]

Mastuoka

[11] Patent Number: 5,008,783
[45] Date of Patent: Apr. 16, 1991

[54] NUMBER PLATE INCLUDING LUMINOUS CHARACTERS

[75] Inventor: Masaaki Mastuoka, Tokyo, Japan

[73] Assignee: World Auto Plate Ltd., Tokyo, Japan

[21] Appl. No.: 339,195

[22] Filed: Apr. 14, 1989

[30] Foreign Application Priority Data

Apr. 18, 1988 [JP] Japan .............................. 63-50996[U]
Apr. 18, 1988 [JP] Japan .............................. 63-50997[U]

[51] Int. Cl.⁵ .............................................. B60Q 1/56
[52] U.S. Cl. ..................................... 362/83.2; 362/333
[58] Field of Search .................... 362/26, 31, 83.2, 333, 362/32, 326, 328, 339

[56] References Cited

U.S. PATENT DOCUMENTS

| | | | |
|---|---|---|---|
| 1,194,294 | 8/1916 | Johanson | 362/333 |
| 1,970,080 | 8/1934 | Edgerton | 362/83.2 |
| 2,057,249 | 7/1934 | Rioux | 362/83.2 |
| 2,131,962 | 10/1936 | McAlpin | 362/83.2 |
| 3,223,833 | 12/1965 | Protzmann | 362/26 |
| 4,811,507 | 3/1989 | Blanchet | 362/31 |

OTHER PUBLICATIONS

Modern Plastics, Henry Pearson, Piping Light with acrylic material 8/46.

Primary Examiner—Allen M. Ostrager
Assistant Examiner—Sue Hagarman
Attorney, Agent, or Firm—Koda and Androlia

[57] ABSTRACT

A vehicular number plate including luminous characters of the type comprising a number plate having a plurality of chracter portions punched therefrom to which a plate molded of a transparent or translucent synthetic resin is adhesively secured and illuminating bulbs for illuminating the character portions, wherein a light scattering plate having a number of quadrangular pyramid-shaped light scattering projections formed thereon is interposed between the number plate and the illuminating bulbs in an area corresponding to positions where the illuminating bulbs are disposed. Each of the quadrangular pyramid-shaped projections has an apex angle which is determined in the range of 90° to 160°. The illuminating bulbs may be replaced with a single fluorescent lamp. In this case, the light scatteering plate includes a receiving portion in which the fluorescent lamp is received and a light scattering portion extending from the receiving portion while having a gradually reduced thickness. The light scattering plate is interposed between the number plate and the fluorescent lamp. To scatter the incoming light, the light scattering poriton is formed with a number of light scattering grooves extending in parallel with the fluorescent lamp.

10 Claims, 5 Drawing Sheets

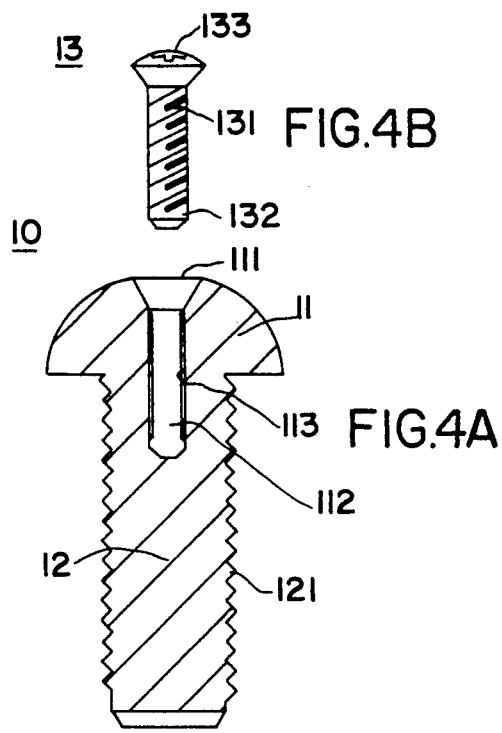
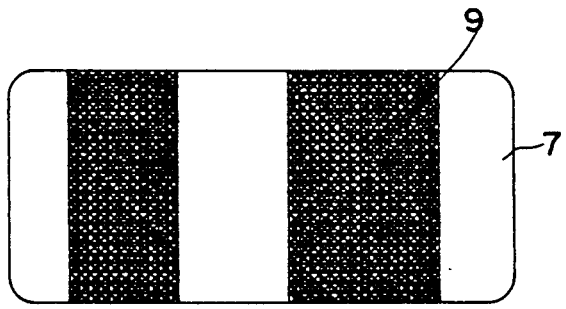
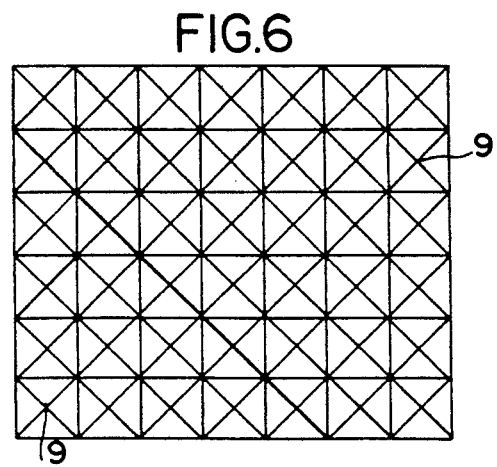

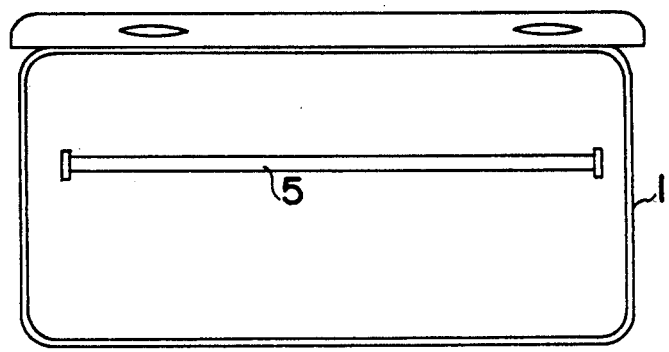
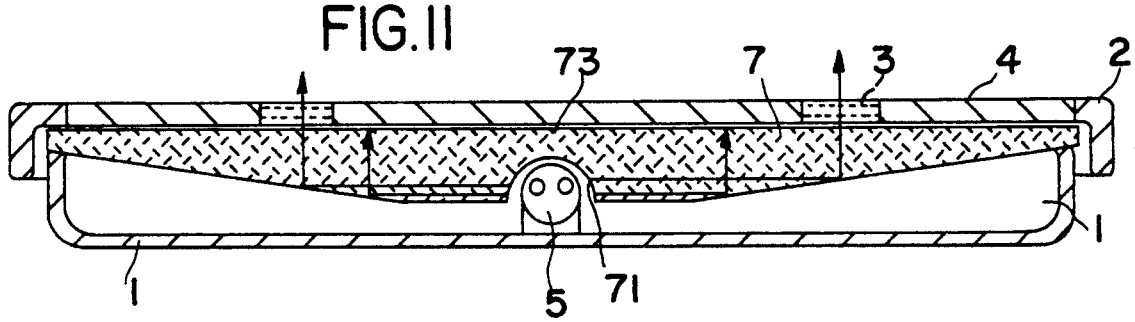
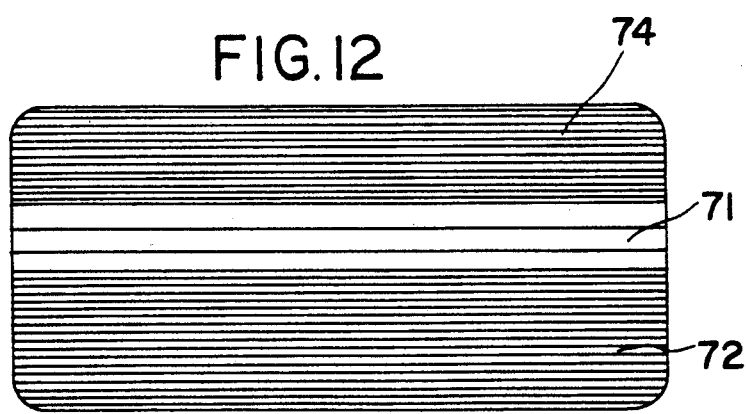

NUMBER PLATE INCLUDING LUMINOUS CHARACTERS

BACKGROUND OF THE INVENTION

1. Technical field of the Invention

The present invention relates to a vehicular number plate including luminous characters and more particular, to a number plate including luminous characters which assures that character portions are more uniformly illuminated than a conventional one, has an excellent durability and can simply be produced with much easiness.

2. Description of the Related Art

A hitherto known number plate including luminous characters (hereinafter referred to as luminous number plate) is typically constructed as shown in FIGS. 1 and 2. Specifically, the number plate includes a case 1 to which an openable frame 2 is fitted. A number plate 4 coated with a paint having a certain specified color is attached to the frame 2 using set-screws 10. The number plate 4 has a plurality of character portion 3 punched therefrom to which symbols in the from of characters and numerals made of a transparent synthetic resin are adhesively secured. To illuminate the character portions 3 at night, illuminating bulbs 5 are disposed inside of the case 1.

With such conventional luminous number plate, the illuminated character portions 3 can be visually recognized from remote locations. However, it has been found that the conventional luminous number plate has a drawback that the respective character portions 3 are illuminated in a different manner such that the character portions located above the illuminating bulbs 5 are brilliantly illuminated but the character portions 3 located remote from the illuminating bulbs 5 appear dark.

To obviate the foregoing drawback, a translucent milkwhite light scattering plate 7 having black paints 6 (see FIG. 3) coated and baked in regions corresponding to the illuminating bulbs 5 while having a thickness gradually reduced toward the peripheral part thereof is interposed between the number plate 4 and the illuminating bulbs 5 (refer to an official gazette of Japanese Utility Model Publication No. 16,308/1978). In practice, a translucent milkwhite plate molded of polypropylene is used for the purpose of producing the light scattering plate 7. The reason why polypropylene has been used for it consists in that a synthetic resin having a high heat resistance should be employed so as to prevent an occurrence of malfunction that the material used for the light scattering plate 7 is discolored or softened under the influence of heat generated by the illuminating bulbs 5. As is well known, polypropylene has a degraded property of adhesiveness and moreover it is very difficult to secure a paint to polypropylene by a baking operation. To avoid this drawback, a light scattering plate having black-colored printed seals 6' adhesively secured thereto in regions corresponding to the illuminating bulbs 5 has been used. The printed seals 6' are such that they have a thickness gradually reduced toward the peripheral part thereof. However, it has been found that the improved light scattering plate 7 has still a drawback that the seals have a low strength against peeling and they are gradually deteriorated under the influence of heat generated by the illuminating bulbs until they are peeled away from the light scattering plate 7.

With such light scattering plate, it has been found that it has another drawback that a boundary 8 between the region where the black-colored paints 6 or the seals 6' are adhesively secured thereto by painting and baking and the region where any paint and sealing means are not provided appears such that the respective characters have stripes formed thereon.

SUMMARY OF THE INVENTION

The present invention has been made with the foregoing background in mind and its object resides in providing a number plate including luminous characters which can simply be produced compared with a conventional one.

Other object of the present invention is to provide a number plate including luminous characters which has an excellent durability.

Another object of the present invention is to provide a number plate including luminous characters which assures that the characters are illuminated uniformly.

To accomplish the above objects, there is provided according to one aspect of the present invention a number plate including luminous characters of the type comprising a number plate having a plurality of character portions punched therefrom to which a plate molded of a transparent or translucent synthetic resin is adhesively secured and illuminating bulbs for illuminating the character portions, wherein a light scattering plate having a light scattering region with a number of quadrangular pyramid-shaped projections formed thereon is interposed between the number plate and the illuminating bulbs in an area corresponding to positions where the illuminating bulbs are disposed.

According to this aspect of the present invention, the light scattering plate has a light scattering region with a number of quadrangular pyramid-shaped projections formed thereon in place of portions coated with a black-colored paint as is the case with the conventional number plate. Thus, there is no need of coating the light scattering plate with such black-colored paint and baking the latter and moreover an occurrence of malfunction that sealing means are peeled away from the light scattering plate can be avoided.

Further, there is provided according to other aspect of the present invention a number plate including luminous characters of the type comprising a number plate having a plurality of character portions punched therefrom to which a plate molded of a transparent or translucent synthetic resin is adhesively secured and an illuminating lamp for illuminating the character portions, wherein a fluorescent lamp is employed for the illuminating lamp and wherein a transparent or translucent light scattering plate including a receiving portion in which at least a part of the fluorescent lamp is received while extending in the longitudinal direction of the light scattering plate and a light scattering portion extending from the receiving portion or from a region in the vicinity of the latter while having a thickness gradually reduced as seen in the outward direction, the light scattering portion being situated opposite to the fluorescent lamp, is interposed between the number plate and the fluorescent lamp.

According to the aspect of the present invention, in addition to the aforementioned advantageous effects, employment of the fluorescent lamp provides an advantageous effect that a resin such as an acrylic resin, a meta-acrylic resin or the like material having an excellent property of light scattering and a low heat resistance can be used for the number plate.

These and other object, features and advantages of the present invention will become more readily apparent from a reading of the following description which has been made with reference to the accompanying drawings.

BRIEF DESCRIPTION OF THE DRAWINGS

The present invention is illustrated in the following drawings in which:

FIG. 4 is a sectional view illustrating a set-screw for fitting a number plate to an openable frame.

FIG. 5 is a front view illustrating a number plate including luminous characters in accordance with a first embodiment of the present invention.

FIG. 6 is an enlarged view illustrating a part of the light scattering region for the number plate in FIG. 5.

FIG. 10 is a front view illustrating a number plate including luminous characters in accordance with a second embodiment of the present invention while an openable frame is kept opened and a light scattering plate is removed from the number plate.

FIG. 11 is a sectional view illustrating the number plate in FIG. 10, and

FIG. 12 is a rear view illustrating a light scattering plate for the number plate as seen from the back side.

DESCRIPTION OF THE PREFERRED EMBODIMENTS

Now, the present invention will be described in detail hereinafter with reference to the accompanying drawings which illustrate preferred embodiments thereof.

Figure 1:
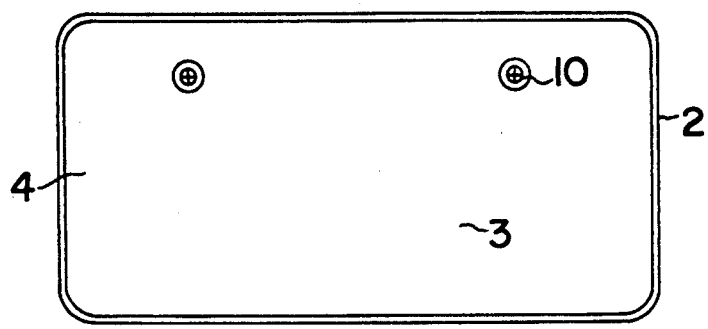
FIG. 1 is a front view illustrating a conventional number plate including luminous characters.
Figure 2:
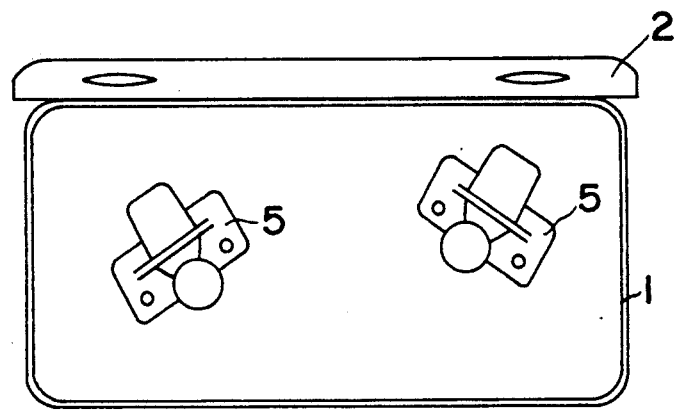
FIG. 2 is a front view illustrating the number plate in FIG. 1 with an openable frame kept opened.
Figure 3:
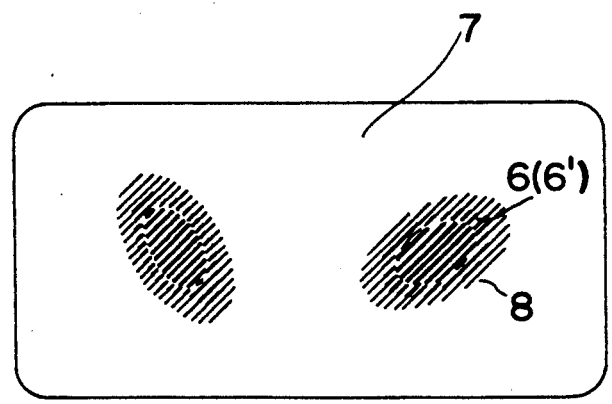
FIG. 3 is a front view illustrating a light scattering plate for the conventional luminous number plate.
Figure 7:
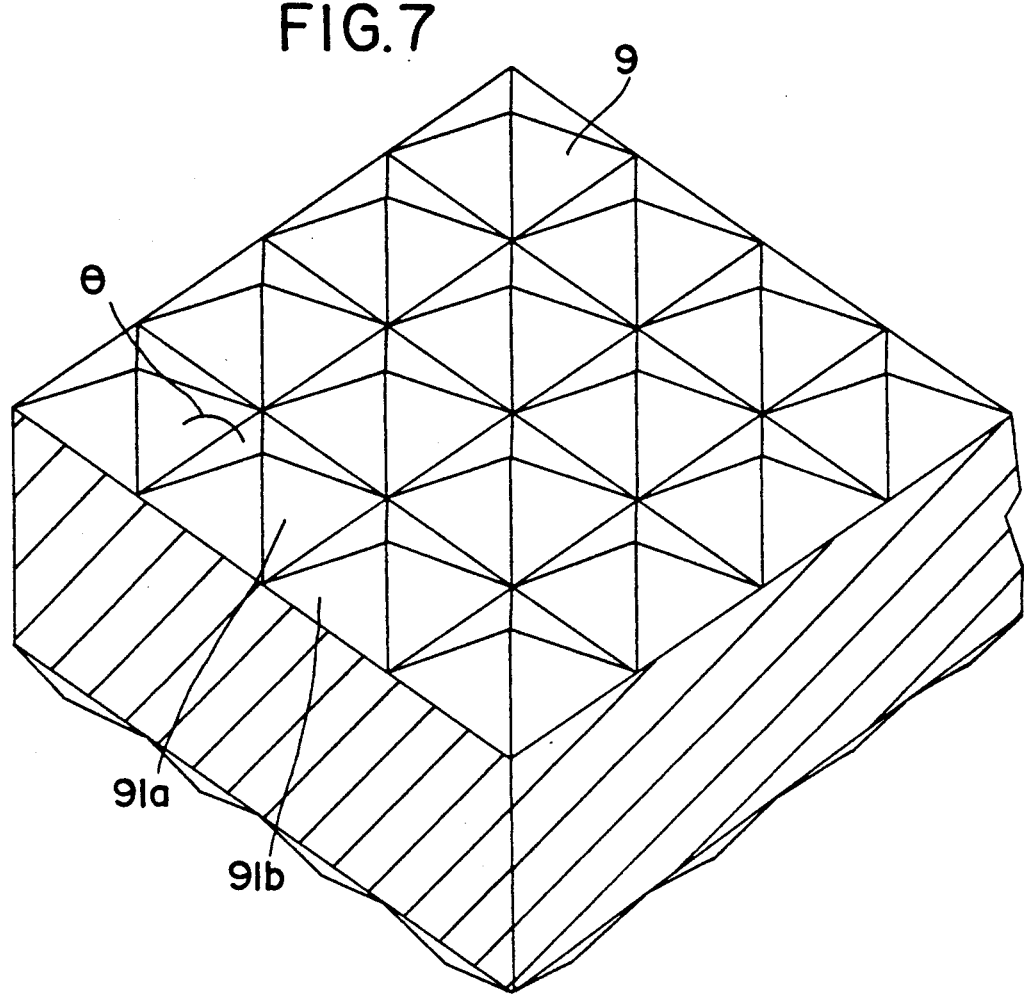
FIG. 7 is a perspective view illustrating a part of the light scattering region in FIG. 6.

A number plate including luminous characters (hereinafter referred to as luminous number plate) in accordance with the present invention is fundamentally constructed as shown in FIGS. 1 and 2. Specifically, the number plate includes a case 1 to which an openable frame 2 is attached. A number plate 4 coated with a paint having a certain specified color is fitted to the frame 2. The number plate 4 has a plurality of character portions 3 punched therefrom to which symbols in the form of characters and numerals made of a transparent synthetic resin are adhesively secured. To illuminate the character portions, illuminating bulbs 5 are attached inside of the case 1 at properly determined positions.

To fit the number plate 4 to the openable frame 2, set-screws 10 are used. Specifically, as shown in FIG. 4, the set-screw 10 comprises a truncated semispherical head 11 and a shaft portion 12 depending from the head 11. The shaft portion 12 is formed with a number of male threads 121 over the outer surface thereof. Further, the set-screw 10 is formed with a threaded hole 113 extending downwardly from the truncated part 111 of the head 11 so that a number of female threads 112 are formed on the inner wall surface of the threaded hole 113 (see FIG. 4A).

Additionally, the set-screw 10 includes a filler screw 13 which comprises a shaft portion 132 having a number of male threads 131 formed thereon to be threadably engaged with the threaded hole 113 and driver grooves 133 to which the foremost end of a driver (not shown) is fitted.

In operation, the filler screw 13 is first threadably engaged with the threaded hole 113. Then, the set-screws 10 are inserted through holes (not shown) on the number plate 4 and the driver is successively fitted into the driver grooves 133 so that the number plate 4 is firmly fitted to the openable frame 2 by rotating the driver in the closing direction so as to allow the set-screws 10 to be threadably engaged with threaded holes (not shown) on the openable frame 2. After the number plate 4 is fitted to the openable frame 2 using the set-screws 10 each having the filler screw 13 threadably engaged therewith, the driver is fitted into the driver grooves 133 again and then it is rotated in the opening direction. This permits only the filler screw 13 to be disengaged from the threaded hole 113 in the shaft portion 12 but the set screw 10 remains unchanged without an occurrence of disengagement from the corresponding threaded hole. Consequently, the number plate 4 can not easily be removed from the frame 2 for the purpose of replacement.

A characterizing feature of the luminous number plate of the present invention consists in that a light scattering plate 7 is interposed between the illuminating bulbs 5 and the number plate 4. As shown in FIGS. 5 and 6, the light scattering plate 7 is provided with a number of quadrangular pyramid-shaped light scattering projections 9 which are located above the illuminating bulbs 5. The projections 9 may be arranged over the surface of the light scattering plate 7 facing the illuminating bulbs 5 (hereinafter referred to as back surface). To assure a high intensity of illumination, it is preferable that the projections 9 are arranged over both the front surface and the back surface of the light scattering plate 7.

Figure 8:
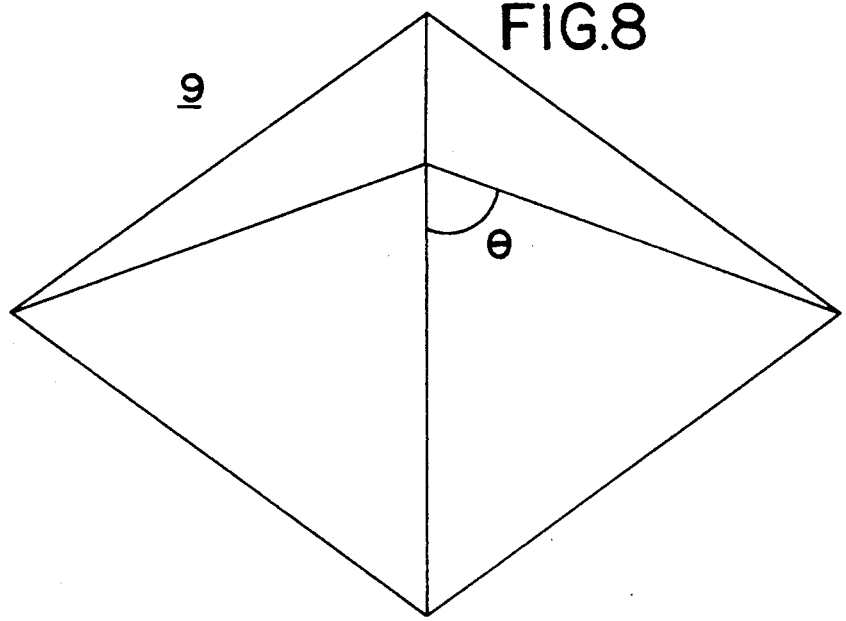
FIG. 8 is a perspective view illustrating a single light scattering projection.

As will be apparent from FIG. 6, the projections 9 are regularly arranged in the form of plural rows on the light scattering plate 7. As shown in FIG. 8 which is a fragmental perspective view of the light scattering plate 7, the pyramid of the respective projections 9 is constructed by a pair of faces 9 1a and another pair of faces 9 1b which define an apex angle of $\theta$ therebetween which is preferably determined in the range of 90° to 160° (see FIG. 8). The reason why the apex angle is determined in that way is described below. Namely, if the apex angle is determined less than 90°, the light scattering plate 7 becomes excessively bright with a light emitted from the illuminating bulbs 5, resulting in the character portions 3 being visually recognized with much difficulties. On the contrary, if the apex angle is determined more than 160°, the result is that the light scattering plate 7 becomes excessively dark. It has been found that the optimum apex angle is around 140°. With this apex angle, the character portions 3 are uniformly illuminated so that the respective characters exhibit an ideal extent of brightness.

Figure 9:
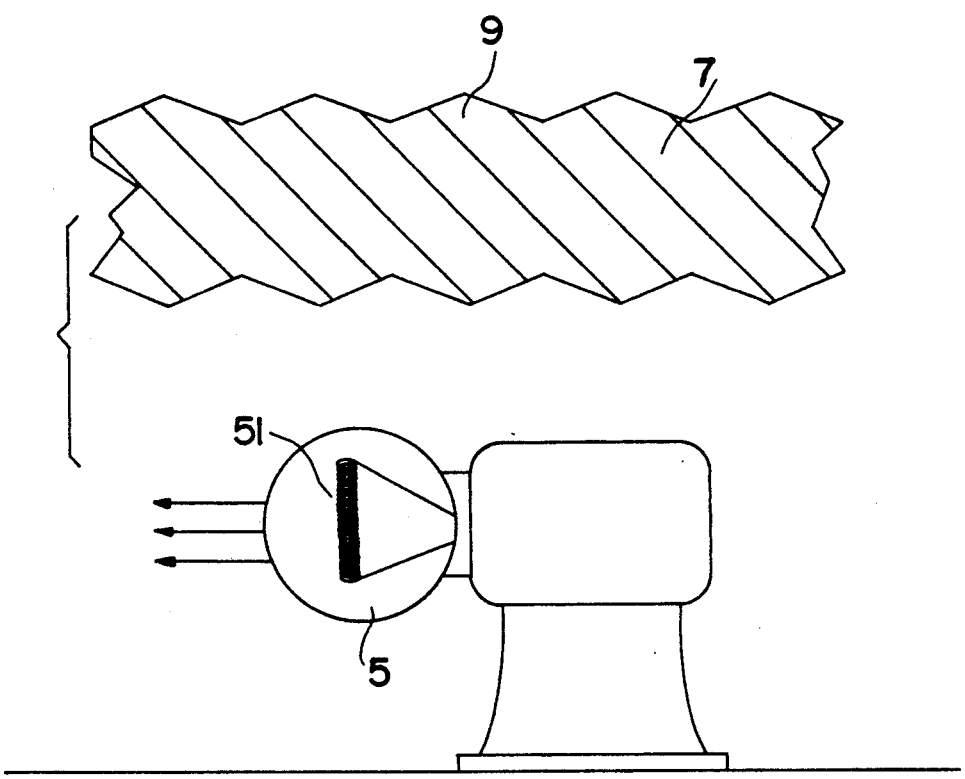
FIG. 9 is a sectional view illustrating the provision of a light scattering plate.

Employment of the light scattering plate as constructed in the above-described manner assures that the characters on the number plate are uniformly illuminated with an ideal level of brightness and thereby they are visually recognized with an improved reliability at night. To this end, it is preferable that the illuminating bulbs 5 are arranged relative to the light scattering plate 7 in such a manner that their filaments 51 extend in the vertical direction, as shown in FIG. 9. With such arrangement, a many quantity of light emitted from the bulbs 5 is radiated in the direction in parallel with the light scattering plate 7 (as represented by arrow marks in the drawing), causing the character portions 3 to be illuminated with a small quantity of light. This leads to a result that the character portions 3 appear dark but they can visually be recognized with much easiness.

The present invention has been described above with respect to the embodiment wherein a number of light scattering projections 9 are arranged in the form of plural rows above the illuminating bulbs 5. Alternatively, light scattering regions each having an elliptical shape may be arranged above the illuminating bulbs with the same advantageous effect in the same manner as the conventional luminous number plate.

FIG. 10 illustrates a number plate including luminous characters in accordance with a second embodiment of the present invention for which a fluorescent lamp is used in place of the foregoing illuminating bulbs. Fundamentally, the number plate is constructed in the same manner as the aforementioned one.

The number plate in accordance with this embodiment is constructed as shown in FIG. 1 and 2. Specifically, the number plate includes a case 1 to which an openable frame 2 is fitted. A number plate 4 coated with a paint having a certain specified color has a plurality of character portions 3 punched therefrom to which symbols in the form of characters and numerals made of a transparent synthetic resin are adhesively secured. To illuminate the character portions 3, a fluorescent lamp 5 is mounted on the case 1 while extending in the longitudinal direction of the latter.

Further, a light scattering plate 7 is interposed between the fluorescent lamp 5 and number plate 4 to scatter a light emitted from the fluorescent lamp 5. The light scattering plate 7 includes a receiving portion 71 in which at least a part of the fluorescent lamp 5 extending in the longitudinal direction of the case 1 is received and a light scattering portion 72 slightly slantwise extending from the receiving portion 71 or from the region in the proximity of the receiving portion 71 while having a gradually reduced thickness (see FIG. 11).

With this construction, a light from the fluorescent lamp 5 is introduced into the interior of the light scattering plate 7 from the light receiving portion 71 in the direction of a width of the case 1 and then it is reflected at the inner wall surface of the light scattering portion 72 to proceed toward the number plate 4. Thus, the flat surface 73 of the light scattering plate 7 is illuminated uniformly. Since the fluorescent lamp 5 has a long length in contrast with the conventional illuminating bulbs and extends in the longitudinal direction of the case 1, the character portions 3 arranged in the longitudinal direction are equally spaced from the light source. This permits the character portions 3 to be more uniformly illuminated than the conventional illuminating bulbs.

For example, an acrylic resin and a meta-acrylic resin each having an excellent light permeability are employable for the light scattering plate 7. Hitherto, the foregoing resins have been not used due to a drawback of low heat resistance. However, since the fluorescent lamp generates a small quantity of hear compared with the illuminating bulbs, it becomes possible to use the foregoing resins.

As shown in FIG. 12, the light scattering portion 72 is formed with a number of fine light scattering grooves 74 extending in parallel with the fluorescent lamp 5. The light scattering grooves 74 serve for effectively reflecting the incoming light from the receiving portion 71 so as to allow the reflected light to proceed toward the smooth surface 73.

The surface 73 of the light scattering plate 7 may be frosted. The frosted surface 73 has an advantage that it damps a light coming from the back surface so as to enable the characters to be visually recognized from remote locations with much easiness.

The second embodiment has been described above with respect to a case where the fluorescent lamp receiving portion 71 is situated in the substantially central region of the light scattering plate 7. It should of course be understood that the fluorescent lamp 5 may be mounted at the upper or lower end of the case 1 while extending in the longitudinal direction, a fluorescent lamp receiving portion may be formed at one end of the light scattering plate 7 and a light scattering portion may be formed which extends from the receiving portion while having a thickness gradually reduced as seen in the direction of a width of the case 1. This construction provides also the same advantageous effects as the foregoing embodiments.

As will be readily apparent from the above description, the present invention has provided a number plate including luminous characters of the type having a number of quadrangular pyramid-shaped light scattering projections formed on a light scattering plate, wherein characters can be more uniformly illuminated than the conventional luminous number plate and the light scattering plate can be molded in an integral structure without any necessity for adhering sealing means to it and coating it with a paint as is the case with the conventional luminous number plate. Another advantageous effects are that it has no fear that paint and sealing means are peeled off under the influence of heat and it has an excellent durability.

As described above, the luminous number plate in accordance with the second embodiment of the present invention is so constructed that a fluorescent lamp is mounted on a case 1 while extending in the longitudinal direction and a light scattering plate includes a light scattering portion so as to allow a light introduced into the interior of the light scattering plate to be reflected toward the flat surface. With this construction, characters on the number plate are illuminated uniformly. Since the characters are equally spaced from the fluorescent lamp serving as a light source, they are illuminated more uniformly than the conventional luminous number plate. Further, since the fluorescent lamp has a long running life and generates a small quantity of heat, the luminous number plate has an excellent durability. Additionally, since the light scattering plate can be molded in an integral structure, it can be produced simply.

What is claimed is:

1. A number plate including luminous characters of the type comprising:
    a number plate having a plurality of character portions punched therefrom,
        a plate molded of transparent or translucent synthetic resin adhesively secured to said number plate, illuminating bulbs for illuminating said character portions disposed behind said number plate, and a light scattering plate made from a transparent or translucent material and having a light scattering region with a number of quadrangular pyramid-shaped projections formed thereon, each of which has an apex angle which is about 140°, in an area only corresponding to positions where said illuminating bulbs are disposed, said light scattering plate being interposed between said number plate and said illuminating bulbs.

2. The number plate as claimed in claim 1, wherein each of said quadrangular pyramid-shaped projections has an apex angle which is determined in the range of 90° to 160°.

3. The number plate as claimed in claim 1 or 2, wherein said illuminating lamps are disposed in such a manner that their filament extends in the vertical direction relative to said light scattering plate.

4. The number plate as claimed in claim 1 or 2, wherein said light scattering region is formed on the front surface and the back surface of said light scattering plate.

5. The number plate as claimed in claim 3, wherein said illuminating lamps are disposed in such a manner that their filament extends in the vertical direction relative to said light scattering plate.

6. A number plate including luminous characters of the type comprising:

a number plate having a plurality of character portions punched therefrom, a plate molded of transparent or translucent synthetic resin adhesively secured to said number plate, and an illuminating lamp for illuminating said character portions, wherein a fluorescent lamp is employed for said illuminating lamp and wherein a transparent or translucent light scattering plate made on polyacryl resin or polymetacryl resin including a receiving portion in which at least a part of said fluorescent lamp is received while extending in the longitudinal direction of said light scattering plate and a light scattering portion extending from said receiving portion or from a region in the vicinity of the latter while having a thickness gradually reduced as seen in the outward direction, said light scattering portion being situated only opposite to said fluorescent lamp, is interposed between said number plate and said fluorescent lamp.

7. The number plate as claimed in claim 6, wherein said light scattering portion is formed with a number of light scattering grooves extending in parallel with the longitudinal direction of said fluorescent lamp.

8. The number plate as claimed by claim 6 or 7, wherein said light scattering plate has a front surface which is subjected to frosting.

9. The number plate as claimed in claim 6 or 7, wherein said light scattering plate is molded of an acrylic resin or a meta-acrylic resin.

10. The number plate as claimed by claim 9, wherein said light scattering plate has a front surface which is subjected to frosting.

* * * * *